(12) United States Patent
Wakana

(10) Patent No.: US 11,627,255 B2
(45) Date of Patent: Apr. 11, 2023

(54) INFORMATION PROCESSING APPARATUS, INFORMATION PROCESSING METHOD, AND NON-TRANSITORY STORAGE MEDIUM

(71) Applicant: CANON KABUSHIKI KAISHA, Tokyo (JP)

(72) Inventor: Toru Wakana, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 65 days.

(21) Appl. No.: 17/174,130

(22) Filed: Feb. 11, 2021

(65) Prior Publication Data
US 2021/0168290 A1 Jun. 3, 2021

Related U.S. Application Data

(63) Continuation of application No. 15/977,411, filed on May 11, 2018, now Pat. No. 10,951,826.

(30) Foreign Application Priority Data

May 22, 2017 (JP) .............................. JP2017-101043

(51) Int. Cl.
*H04N 5/232* (2006.01)
*G06T 5/00* (2006.01)
(Continued)

(52) U.S. Cl.
CPC ......... *H04N 5/23293* (2013.01); *G06T 5/006* (2013.01); *H04N 1/00307* (2013.01);
(Continued)

(58) Field of Classification Search
CPC ........... H04N 5/23293; H04N 1/00307; H04N 1/00411; H04N 1/00413; H04N 1/00474;
(Continued)

(56) References Cited

U.S. PATENT DOCUMENTS

| 8,509,563 | B2 * | 8/2013 | Robinson | .............. G06F 40/279 |
| | | | | 382/284 |
| 9,317,486 | B1 * | 4/2016 | Story, Jr | ............... G06F 3/0425 |

(Continued)

FOREIGN PATENT DOCUMENTS

| CN | 103118282 A | 5/2013 |
| JP | 2000-187286 A | 7/2000 |

(Continued)

OTHER PUBLICATIONS

Panzhe; " Color Analysis and Correction of Prepress Images;" Teaching and Research Section of Graphics, School of Software, Minjiang College, Fuzhou, Fujian 350011; China Academic Journal Electronic Publishing House; 1994-2022.; pp. 1-4.

*Primary Examiner* — Shahbaz Nazrul
(74) *Attorney, Agent, or Firm* — Canon U.S.A., Inc. IP Division

(57) ABSTRACT

A predetermined image correction process is automatically performed on an image, and information for identifying that the predetermined image correction process has been performed is displayed in a state that an image having undergone the predetermined image correction process is being displayed.

12 Claims, 13 Drawing Sheets

(51) Int. Cl.
*H04N 5/262* (2006.01)
*H04N 1/00* (2006.01)

(52) U.S. Cl.
CPC ..... *H04N 1/00411* (2013.01); *H04N 1/00413* (2013.01); *H04N 1/00474* (2013.01); *H04N 1/00482* (2013.01); *H04N 1/00718* (2013.01); *H04N 1/00737* (2013.01); *H04N 1/00748* (2013.01); *H04N 1/00779* (2013.01); *H04N 1/00801* (2013.01); *H04N 5/23216* (2013.01); *H04N 5/23222* (2013.01); *H04N 5/23229* (2013.01); *H04N 5/232933* (2018.08); *H04N 5/2628* (2013.01); *G06T 2207/20132* (2013.01); *H04N 2201/0084* (2013.01); *H04N 2201/0096* (2013.01)

(58) Field of Classification Search
CPC ........... H04N 1/00482; H04N 1/00718; H04N 1/00737; H04N 1/00748; H04N 1/00779; H04N 1/00801; H04N 5/23216; H04N 5/23222; H04N 5/23229; H04N 5/232933; H04N 5/2628; H04N 2201/0084; H04N 2201/0096; G06T 5/006; G06T 2207/20132
See application file for complete search history.

(56) References Cited

U.S. PATENT DOCUMENTS

| 2006/0043264 | A1* | 3/2006 | Sakurai | H04N 1/387 |
| | | | | 250/208.1 |
| 2014/0362248 | A1 | 12/2014 | Ishida | |
| 2016/0217340 | A1* | 7/2016 | Miyauchi | G06T 7/13 |
| 2016/0224854 | A1* | 8/2016 | Ito | G06V 10/243 |

FOREIGN PATENT DOCUMENTS

| JP | 2006-279359 A | 10/2006 |
| JP | 2008-177762 A | 7/2008 |
| JP | 2011-166778 A | 8/2011 |
| JP | 2016-143966 A | 8/2016 |

* cited by examiner

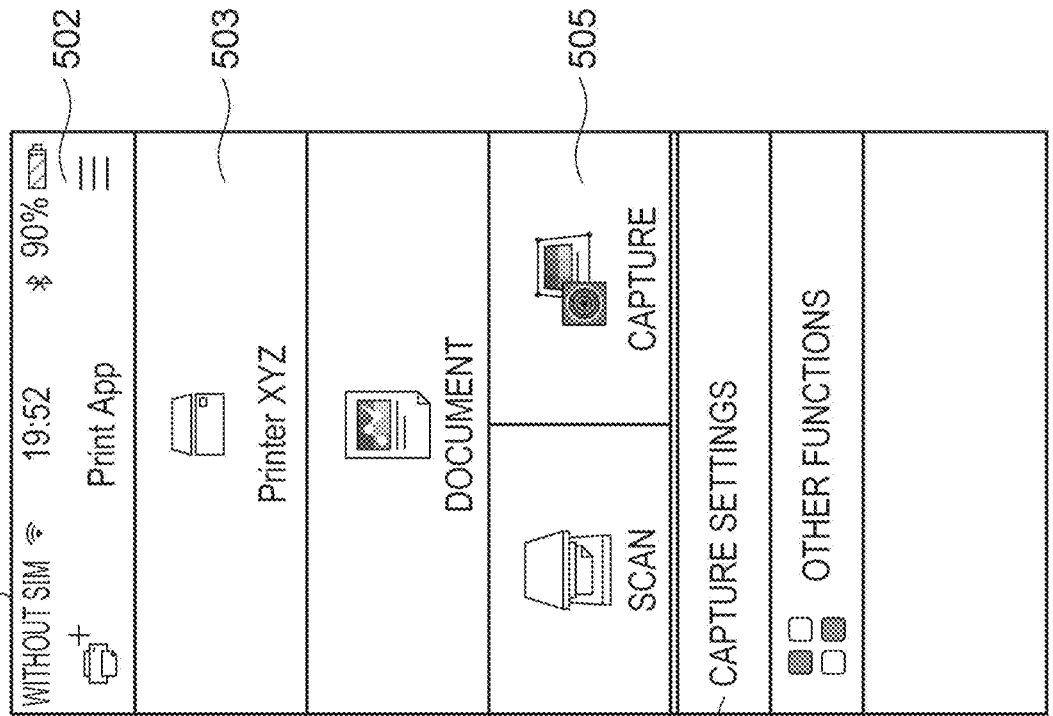

INFORMATION PROCESSING APPARATUS, INFORMATION PROCESSING METHOD, AND NON-TRANSITORY STORAGE MEDIUM

CROSS-REFERENCE TO RELATED APPLICATION

This application is a Continuation of U.S. application Ser. No. 15/977,411, filed May 11, 2018, which claims priority from Japanese Patent Application No. 2017-101043, filed May 22, 2017, which are hereby incorporated by reference herein in their entireties.

BACKGROUND OF THE INVENTION

Field of the Invention

The present disclosure relates to an information processing apparatus for performing image correction processing, an information processing method, and a non-transitory storage medium.

Description of the Related Art

Mobile terminals having advanced information processing functionality, such as a smart phone and a tablet PC, have been widely popular. Each of these mobile terminals may have a camera for image-capturing, and an image-capturing function using such a camera can be used for capturing an image of a subject. Some of applications using such a mobile terminal may capture an image of a subject by using the image-capturing function and then perform an image correction process on the captured image of the subject.

Japanese Patent Laid-Open No. 2016-143966 discloses a mobile terminal which identifies whether a subject on an image is a document or a white board and performs an image correction process on the identified subject (a document or a white board).

A mobile terminal application in recent years may start a camera in the mobile terminal and may display in real time, on a display unit of the mobile terminal, a video image (live view video image) of a subject being image-captured by the camera until a shutter button is pressed. A user may press the shutter button by checking the live view video at the same time. Then, the application may obtain an image of a subject and receive a user's selection of an image correction process. The application may then perform the image correction process selected by the user on the obtained image. The application may then display an image having undergone the image correction process.

Here, in order to reduce the complexity for a user to select an image correction process, an image correction process determined in advance (or a predetermined image correction process) may be performed on the obtained image. In this case, typically it is not known from the displayed image whether the predetermined image correction process has been performed or not.

SUMMARY OF THE INVENTION

According to an aspect of the present disclosure, an information processing apparatus includes an obtain unit configured to obtain an image in response to an instruction from a user, an image correction unit configured to perform an image correction process on the obtained image, and a display unit configured to display an image having undergone the image correction process performed by the image correction unit. The image correction unit performs a predetermined image correction process on the image obtained by the obtain unit in response to the instruction. The display unit displays information for identifying the performed predetermined image correction process in a state that the image having undergone the predetermined image correction process is being displayed.

Further features of the present invention will become apparent from the following description of exemplary embodiments with reference to the attached drawings.

BRIEF DESCRIPTION OF THE DRAWINGS

FIGS. 5A and 5B are schematic diagrams illustrating screens displayed on the mobile terminal.

DESCRIPTION OF THE EMBODIMENTS

Embodiments of the present disclosure will be described below with reference to drawings.

First Embodiment

Figure 1A:
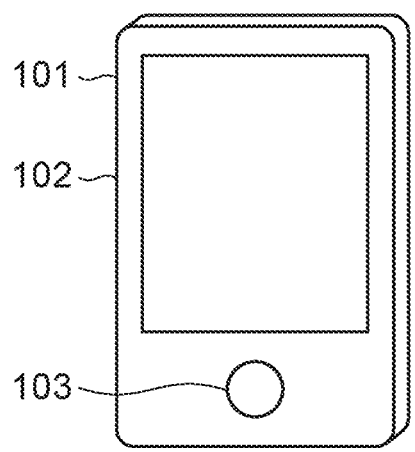
FIGS. 1A and 1B illustrate outer appearances of a mobile terminal.
Figure 1B:
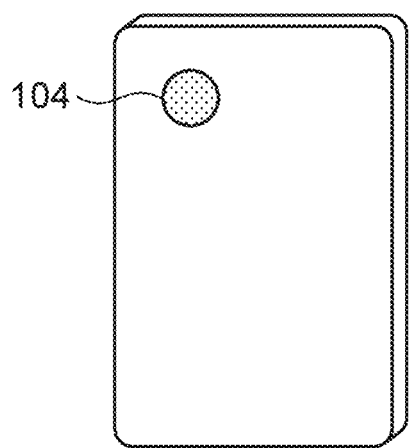

FIGS. 1A and 1B illustrate outer appearances of a mobile terminal (such as an information processing apparatus or an image processing apparatus) 101 according to a first embodiment. FIG. 1A illustrates a front side of the mobile terminal 101. The front side has a touch panel display 102 and an operation button 103 thereon. FIG. 1B illustrates a back side of the mobile terminal 101. The back side has a camera 104 thereon. The mobile terminal 101 provides an image-capturing function using the camera 104. This embodiment can use any terminal apparatus having an image-capturing function. In other words, this embodiment can use a smart phone or a cellular phone having an image-capturing function or a digital camera having a communication function. The camera 104 has an auto-focus mechanism (not illustrated) and is configured to automatically detect an in-focus state based on a contrast ratio and an infrared ray transmission/reception time so that a focal distance or a subject distance can be measured.

Figure 2:
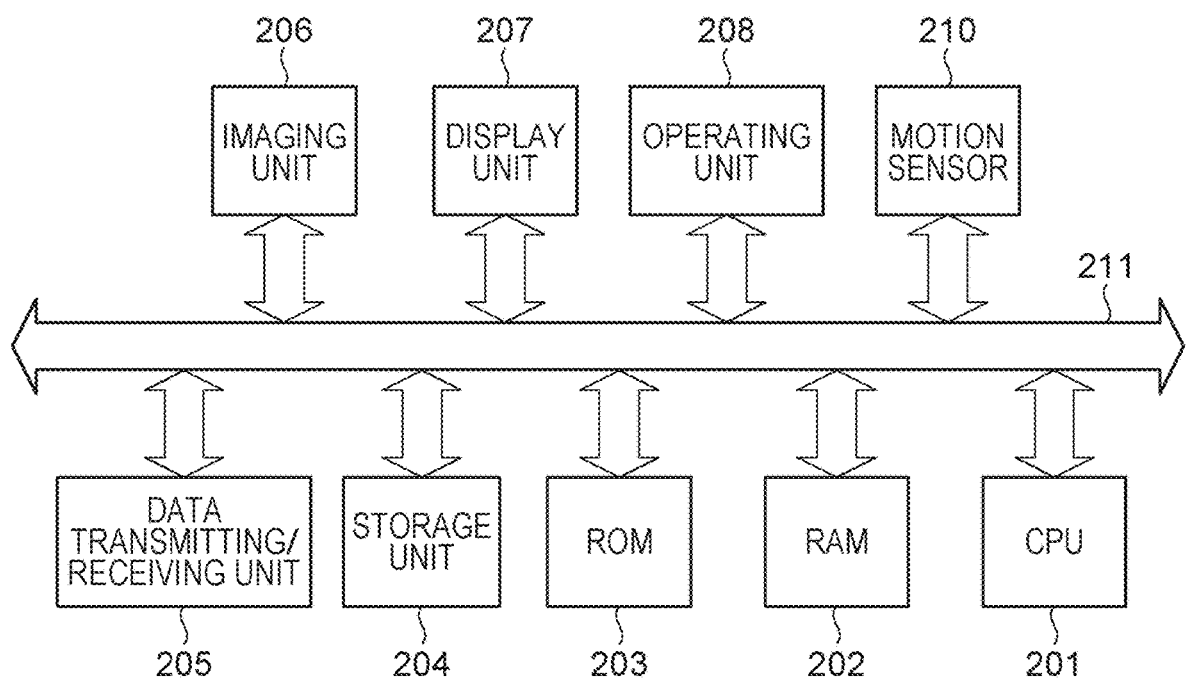
FIG. 2 is a hardware block diagram illustrating a mobile terminal.

FIG. 2 is a hardware block diagram illustrating the mobile terminal 101. However, the block diagram is given merely for illustrating an example of a configuration for implementing this embodiment.

Referring to FIG. 2, a CPU 201, a RAM 202, and a ROM 203 transmit and receive a program and data via a data bus 211. To the data bus 211, a storage unit 204, a data transmitting/receiving unit 205, an imaging unit 206, a display unit 207, an operating unit 208, and a motion sensor 210 are connected. Additionally, those components and the CPU 201, the RAM 202, and the ROM 203 can transmit and receive a program and data mutually.

Figure 3:
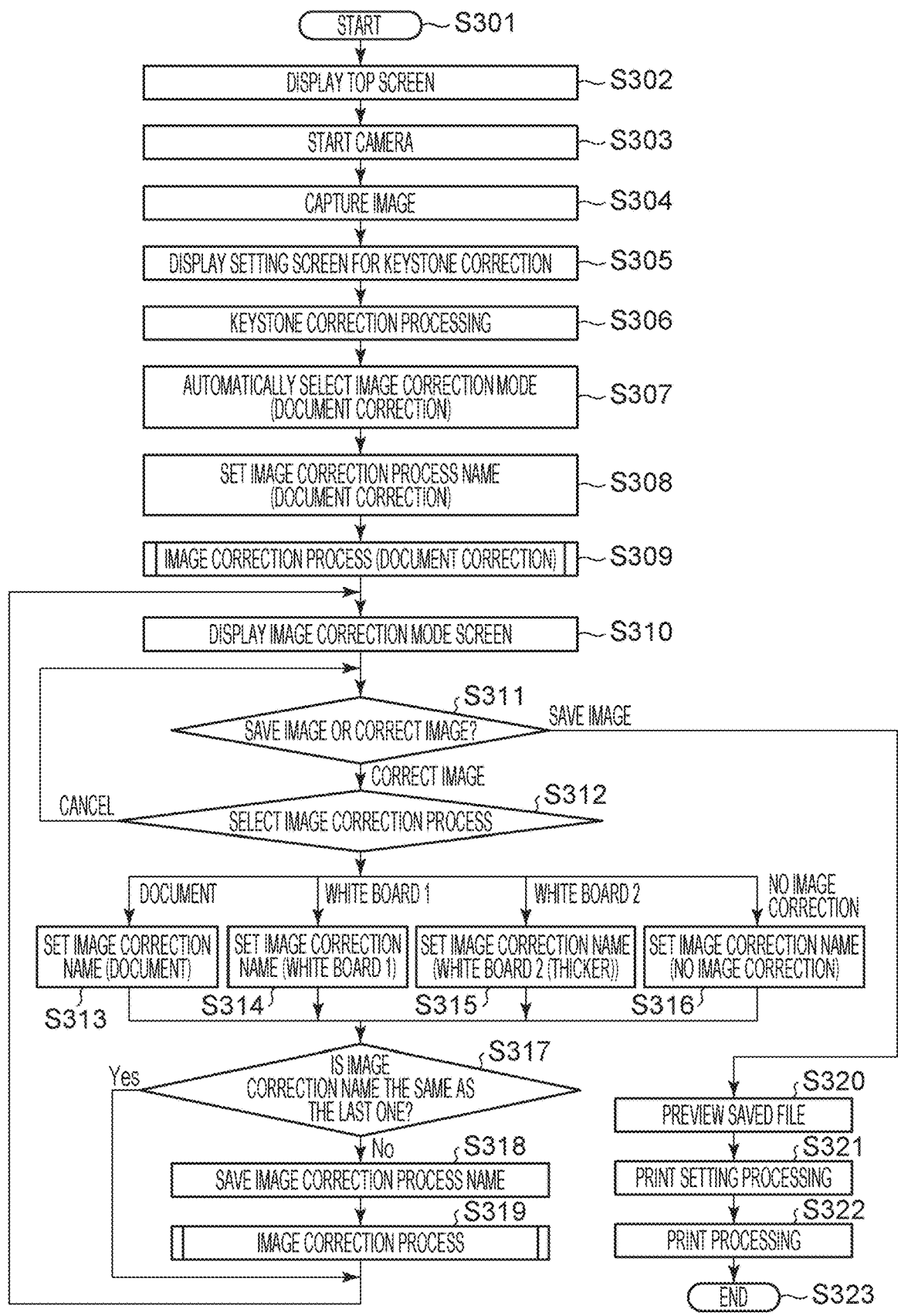
FIG. 3 is a flowchart illustrating a process according to an embodiment.

The storage unit 204 may be a flash memory and is configured to store image data and a program for executing processing illustrated in FIG. 3.

The data transmitting/receiving unit 205 may have a wireless LAN controller and is configured to implement transmission/reception of data to/from an external device.

The imaging unit 206 may be a camera or an image sensor and is configured to obtain an image of a subject such as a document or a white board by image-capturing the subject. Data of the obtained image (captured image) may be provided along with header information including a manufacturer's name and a model name of the mobile terminal, an image resolution, a diaphragm (F value), and a focal distance, which is then transmitted to corresponding units.

The display unit 207 may be a touch panel display and is configured to display a live view video image of a subject and a shutter button for image-capturing using camera functionality.

The operating unit 208 may be a touch panel or an operation button and is configured to receive a user operation and transmit information on the operation to a corresponding unit.

The motion sensor 210 may include a three-axis acceleration sensor, an electronic compass, and a three-axis angular velocity sensor and is configured to be capable of detecting an orientation or a movement of the mobile terminal 101 by utilizing publicly known technologies.

The CPU 201 may execute a program held in the ROM 203 or the storage unit 204 to control a component within the mobile terminal 101.

The embodiment is applicable to any terminal apparatus having a display unit and an operating unit. In other words, the embodiment is applicable to a smart phone and a tablet terminal having a touch panel display and a PC with a mouse and a touch panel.

User interface (UI) screens illustrated in FIGS. 5A and 5B to 13 will be described. Those UI screens may be displayed by application programs held in the storage unit 204 and executed by the CPU 201.

Next, FIGS. 5A and 5B will be described. FIG. 5A illustrates a screen 501 to be displayed on the display unit 207 when the CPU 201 executes an application program held in the storage unit 204. The screen 501 is an entire top screen of the application to be displayed on the display unit 207 of the mobile terminal.

A display field 502 displays a name ("Print App") of an application installed and executed by the CPU 201.

An icon 503 represents a name ("Printer XYZ") of a printer connected to the mobile terminal.

A capture settings button 504 is a button usable by a user for setting the type of image correction process to be performed first on a captured image. When a user presses the button 504, the display on the display unit 207 is changed from the screen illustrated in FIG. 5A to a screen, not illustrated. On the screen, the user can select an image correction mode to be applied to a captured image from a plurality of types of image correction mode (image correction process), which will be described below. For example, when a document image correction process mode is selected and is set, the image document correction process for document is first performed on an image of a subject captured by a user, and a result thereof is then displayed. According to this embodiment, the button 504 is provided so that an image correction mode can be set. However, a fixed image correction mode can be set at all times without the button 504. In other words, a document image correction process mode may be set fixedly as a default image correction process to be automatically performed first on a captured image. Alternatively, without the button 504, an image correction process performed last time may be set to perform. A "mode for performing no image correction process" may be included in settable image correction modes. When the mode is set, no image correction process is performed on a captured image. The following descriptions assume that the document image correction process mode is set to be performed on a captured image.

A capture icon 505 is an icon to be pressed by a user for using an image-capturing function using the camera 104 of the mobile terminal 101. When the icon is pressed, the CPU 201 starts the camera 104 of the mobile terminal 101 and shifts it to an image-capture enabled state (FIG. 5B). The starting the camera 104 includes invoking and executing a control application for the camera 104 included in the mobile terminal 101.

FIG. 5B illustrates a screen 509 to be displayed on the display unit 207 by the CPU 201 for enabling to capture an image of a subject. The screen 509 includes (or displays) a display area 510, a shutter button 511, and an image call icon 512 but does not include (or not display) an icon or a name of a preset image correction mode (such as an icon or a text string representing a "DOCUMENT"). In other words, information for identifying a type of image correction process is not displayed while a live view video image which can receive an image-capturing instruction from a user is being displayed so that visually unclear display of the live view video image of the subject can be prevented.

The display area 510 is an area displaying a live view video image of a subject for live view image-capturing. The live view video image is a moving image to be displayed under control of the CPU 201 and may be a real time video image of a subject captured by the camera 104, for example. A user can press the shutter button by checking a displayed live view video image at the same time. The CPU 201 is configured to capture an image of a subject in response to detection of a press by a user of the shutter button while a live view video image is being displayed. In other words, the CPU 201 keeps displaying a live view video image of a subject on the display area 510 until a user presses the shutter button.

The shutter button 511 functions as a unit for receiving an instruction for capturing an image of a subject from a user while a live view video image is being displayed, as described above. When the shutter button 511 is pressed, the CPU 201 uses a control application for the camera 104 to capture an image of the subject image-captured by the camera 104. The CPU 201 changes the display content on the display unit to a screen illustrated in FIG. 6 by setting the captured image as a target for an image correction process, which will be described with reference to FIG. 6 and subsequent figures. Instead of the shift to the screen as illustrated in FIG. 6 immediately after the shutter button 511 is pressed, the captured image may be displayed once on the display area 510, and, in response to confirmation by a user, the screen displayed on the display unit 207 may be shifted to the screen 601 in FIG. 6.

Figure 6:
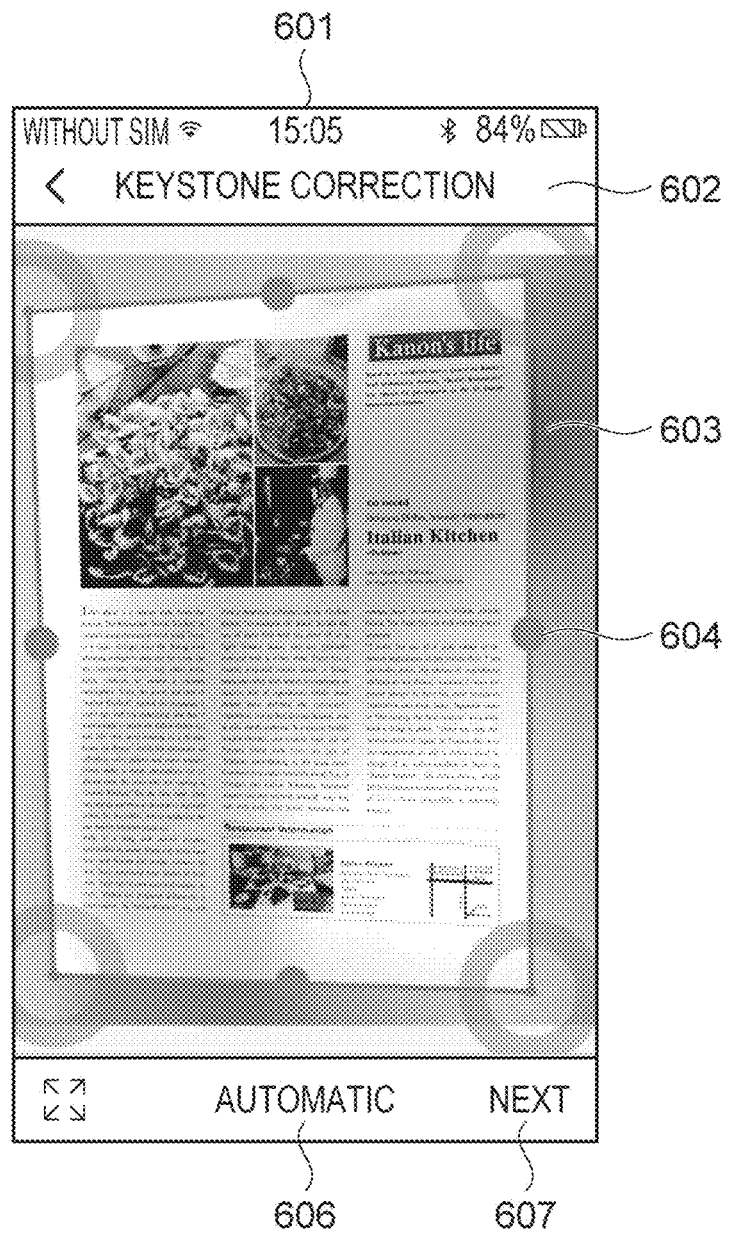
FIG. 6 is a schematic diagram illustrating a screen displayed on the mobile terminal.

If a user presses the icon 512, the CPU 201 displays a list of images saved in the storage unit 204 on the display unit, and changes the display to the screen as illustrated in FIG. 6 by setting the image selected by a user from the list as a target of an image correction process, which will be described with reference to FIG. 6 and subsequent figures. Instead of the shift to the screen 601 in FIG. 6 immediately after an image is selected from the list, the selected image may be displayed as a still image once on the display area 510 and, in response to confirmation by a user, the screen may be shifted to the screen in FIG. 6. The following descriptions assume that an image of a subject image-captured in response to an image-capture instruction is set as a target of an image correction process.

Next, FIG. 6 will be described. FIG. 6 illustrates the screen 601 to be displayed on the display unit 207 by the CPU 201. The screen 601 is a screen for receiving a user operation for performing a keystone correction process. On the screen 601, an area to undergo the keystone correction process is to be designated. The keystone correction process according to this embodiment is processing for performing geometric correction on an image in the area designated of the captured image to a rectangular or square shape. This image cut-out processing may also be called cropping processing.

FIG. 6 further illustrates a display field 602 displaying a name ("KEYSTONE CORRECTION") of a screen displayed on the display unit 207.

FIG. 6 further illustrates a display area 603 displaying a captured image of a subject. The display area 603 displays a cropping frame 604 and handlers for transforming the cropping frame 604, which will be described below.

The cropping frame 604 displays a cut-out processing area to undergo a keystone correction process. The handlers for transforming the frame 604 are set at four corners of the frame 604 and the middle point of each border of the frame 604 and are to be operated by a user.

An icon 606 is a selection icon usable for instructing an aspect ratio of an image having undergone the keystone correction process. FIG. 6 illustrates a state that "AUTOMATIC" is selected. The aspect ratio is selectable from "AUTOMATIC/A4/LTR".

An icon 607 is a selection icon usable for instructing to move to the next processing step. When the icon 607 is pressed by a user, the displayed screen is shifted to a screen 701 illustrated in FIG. 7. For the screen shift, the CPU 201 performs a keystone correction process on the image of the area designated in the cropping frame 604 and performs an image correction process based on a preset image correction mode on the image having undergone the keystone correction process. According to this embodiment, a document image correction process is performed, as described above. The document image correction process removes shadow shown in an image to increase the brightness of the image. The CPU 201 then displays the corrected image on the screen 701 illustrated in FIG. 7.

Figure 7:
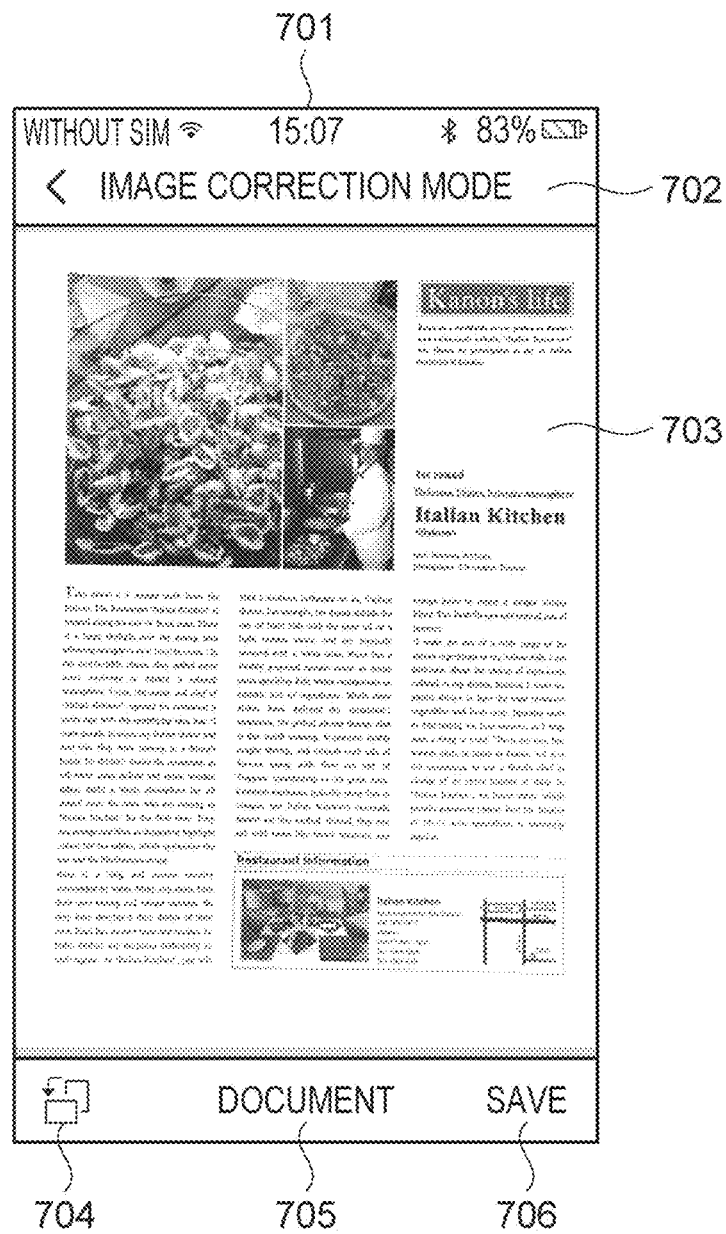
FIG. 7 is a schematic diagram illustrating a screen displayed on the mobile terminal.

FIG. 7 will be described. The screen 701 in FIG. 7 is a screen displayed on the display unit 207 by the CPU 201. The screen 701 is a screen usable by a user for confirmation before the image having undergone the image correction process is saved and usable for receiving a user operation for changing the type of image correction process. The screen 701 displays a result of the image correction process based on a preset image correction mode on the image having undergone a keystone correction process and a name of the image correction mode (or information for identifying the type of image correction process).

FIG. 7 illustrates a display field 702 displaying a name ("IMAGE CORRECTION MODE") of a screen displayed on the display unit 207.

FIG. 7 further includes a display area 703 displaying a result of the image correction process based on a preset image correction mode. Here, the display area 703 displays a result of a performed document image correction process.

FIG. 7 illustrates an icon 704 that is a selection icon usable for instructing to rotate (by 90 degrees/180 degrees/ 270 degrees) the image displayed in the display area 703 on the display unit 207. When a user presses the selection icon, rotation angle options (90 degrees/180 degrees/270 degrees) (not illustrated) are displayed. When a user selects an arbitrary rotation angle from the options, the CPU 201 performs rotation processing by the rotation angle designated for the image 703 displayed on the display unit 207. After that, the CPU 201 stores the rotated image in the storage unit 204 and displays it on the display unit 207.

Figure 8:
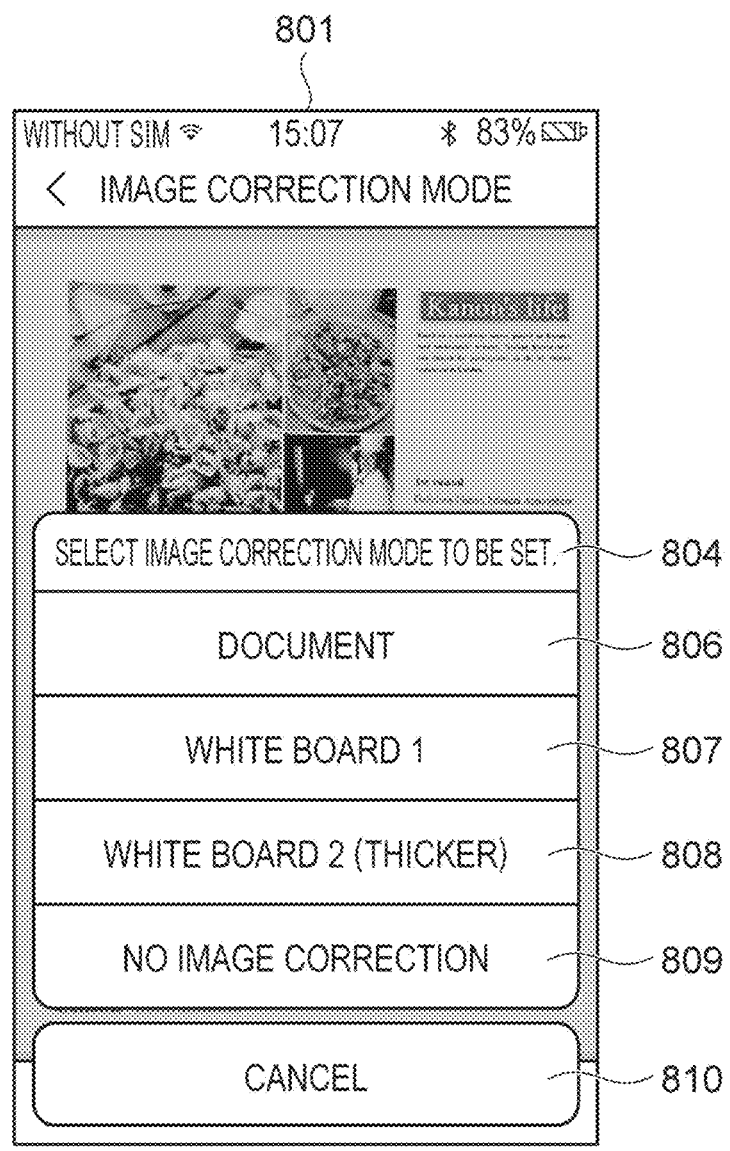
FIG. 8 is a schematic diagram illustrating a screen displayed on the mobile terminal.

FIG. 7 further illustrates an icon 705 representing a name of an image correction process to be applied to the image displayed in the display area 703. The icon 705 displays identification information for identifying the type of image correction process along with an image having undergone the image correction process. Here, "DOCUMENT" is displayed. Displaying the identification information, which is not displayed while a live view video image of a subject is being displayed (FIG. 5B), along with an image having undergone an image correction process may facilitate identification by a user of the type of image correction process that has been performed. Having described that, according to this embodiment, a name (text string) of the type of image correction process is given as the identification information, an icon representing the type of image correction process may be displayed. When a user presses the icon 705, the CPU 201 additionally displays a list 804 of image correction processes on the display unit 207, as illustrated in FIG. 8.

Figure 12:
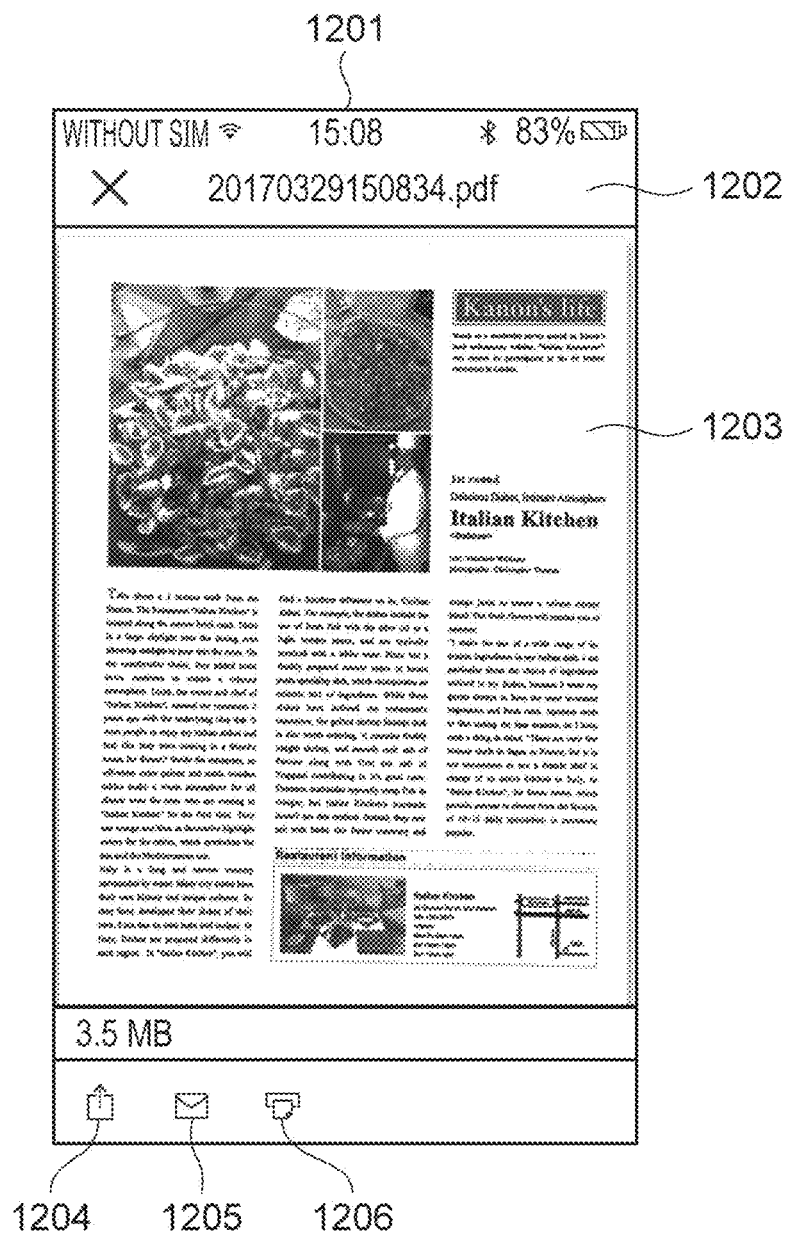
FIG. 12 is a schematic diagram illustrating a screen displayed on the mobile terminal.

The icon 706 is a selection icon for instructing to move to saving (the next processing step). When a user presses the icon 706, the CPU 201 converts the format of the image displayed in the display area 703 to a PDF file and displays a screen 1201 as illustrated in FIG. 12 including a preview of the PDF file on the display unit 207.

Next, FIG. 8 will be described. FIG. 8 illustrates a screen 801 to be displayed on the display unit 207 by the CPU 201. The screen 801 is a screen for receiving a selection of image correction mode from a user and provides options to the user.

The list 804 is a list of image correction process options.

An option 806 indicates that the type of image correction process to be performed on an image having undergone the keystone correction process is a document image correction process. When the option 806 is pressed by a user, the CPU 201 performs the document image correction process on the image having undergone the keystone correction process and displays the screen 701 illustrated in FIG. 7.

An option 807 indicates that the type of image correction process to be performed on an image having undergone the keystone correction process is a white board image process. When the option 807 is pressed by a user, the CPU 201 removes shadow shown on the image having undergone the keystone correction process to increase the brightness of the image and performs an image correction process to monochromatically display a cluster part having similar colors in the image having the increased brightness. The CPU 201 then displays a screen 901 illustrated in FIG. 9 including the image having undergone the image correction process.

Figure 10:
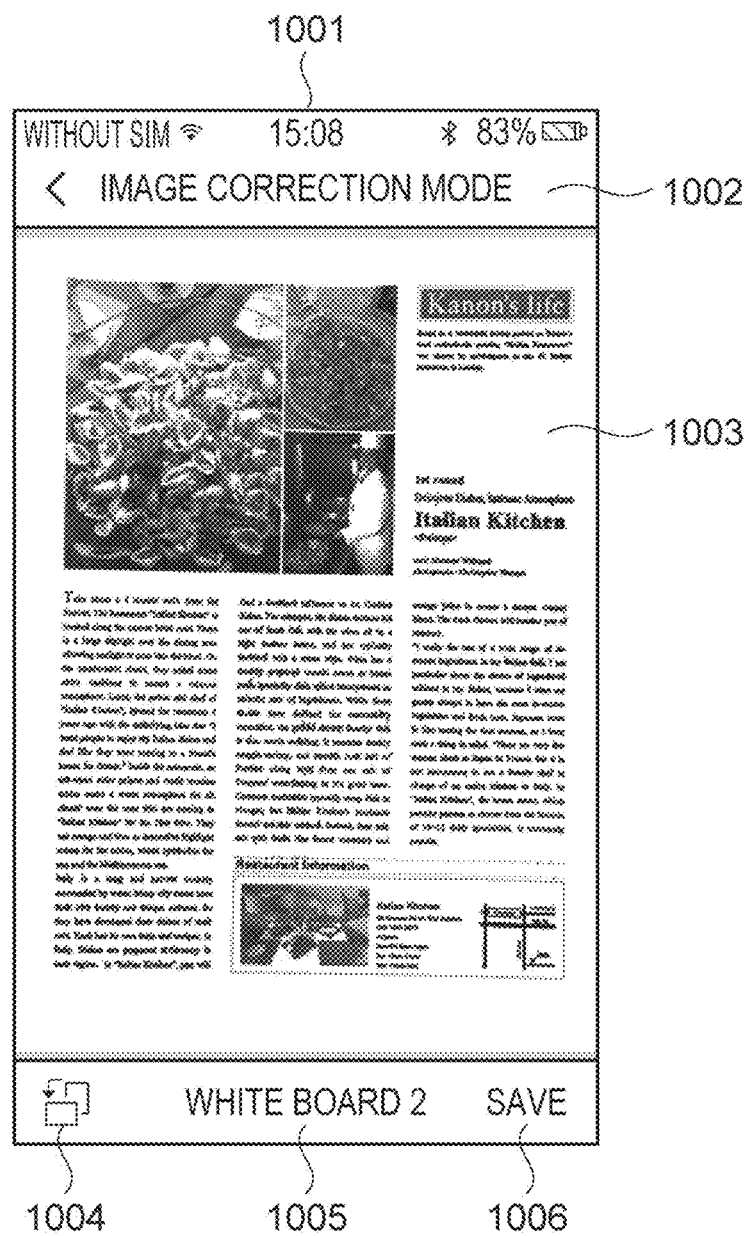
FIG. 10 is a schematic diagram illustrating a screen displayed on the mobile terminal.

An option 808 also indicates the type of image correction process to be performed on an image having undergone the keystone correction process is a white board image process. The option 808 and the option 807 are different in size of the cluster part to be monochromatically displayed. When the option 808 is pressed by a user, the CPU 201 removes shadow shown on the image having undergone the keystone correction process to increase the brightness of the image and performs an image correction process to monochromatically display a cluster part having similar colors in the image having the increased brightness. For detection of the cluster part, a part having a size larger than that of the cluster part detected based on the option 807 is to be detected. The CPU 201 then displays a screen 1001 as illustrated in FIG. 10 including the image having undergone the image correction process.

An option 809 may be selected to perform no types of image correction process on an image having undergone the keystone correction process. When the option 809 is pressed by a user, the CPU 201 displays a screen 1101 illustrated in FIG. 11 including the image having undergone a keystone correction process as it is.

An option 810 may be selected to cancel a change of the type of image correction process. When the option 810 is pressed by a user, the CPU 201 cancels the additional display of the list 804 and again displays the screen displayed when the list 804 is called. For example, in a case where the icon 705 is pressed to call the list 804 when the screen 701 in FIG. 7 is displayed, the screen 701 in FIG. 7 is displayed again in response to the press of the option 810.

Figure 9:
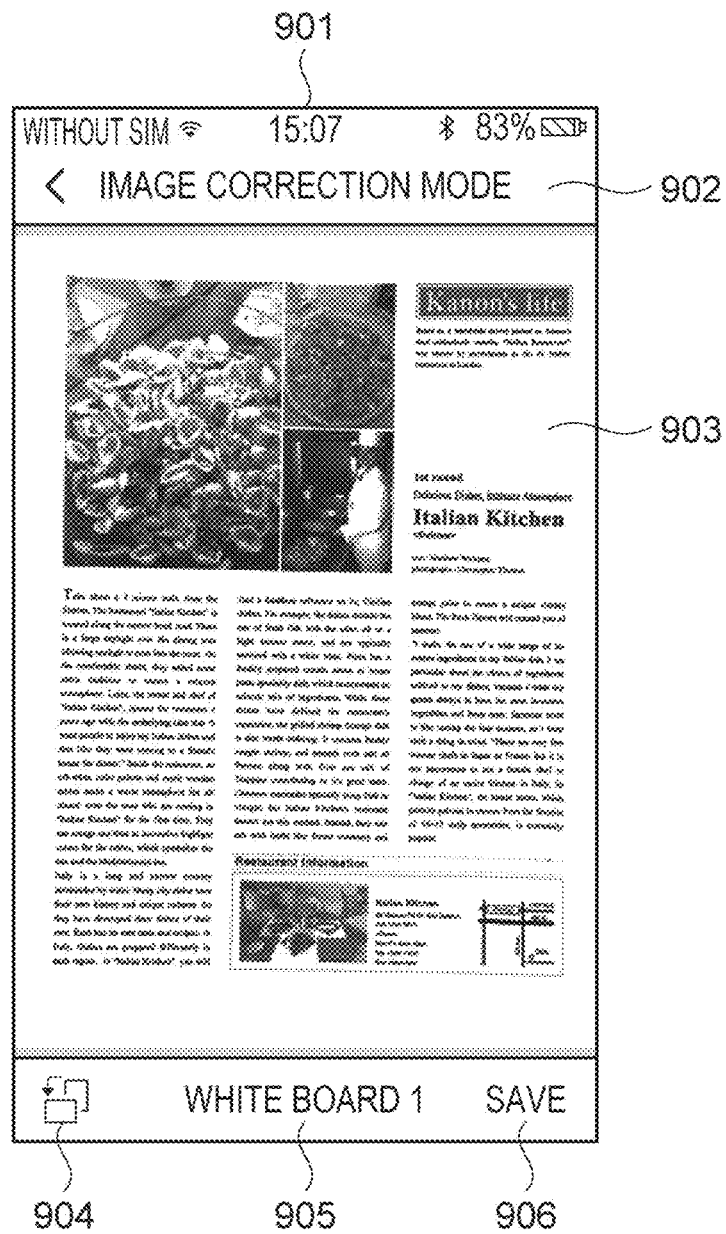
FIG. 9 is a schematic diagram illustrating a screen displayed on the mobile terminal.

Next, FIG. 9 will be described. FIG. 9 illustrates a screen 901 to be displayed on the display unit 207 by the CPU 201. The screen 901 is usable by a user for confirmation before an image having undergone an image correction process is saved and is also usable for receiving a user operation for changing the type of image correction process. The screen 901 displays a result of the image correction process in the image correction mode based on the option 807 performed on the image having undergone the keystone correction process and a name of the image correction mode (or information for identifying the type of image correction process).

FIG. 9 further illustrates a display field 902 similar to the display field 702.

FIG. 9 further illustrates a display area 903 displaying a result of the image correction process in the image correction mode based on the option 807. Referring to FIG. 9, the display area 903 displays a result of a first image correction process for whiteboard.

An icon 904 in FIG. 9 is similar to the icon 704.

FIG. 9 further illustrates an icon 905 which displays the name of the image correction process applied to the image displayed on the display area 903, similarly to the icon 705. Referring to FIG. 9, the icon 905 displays "WHITE BOARD 1" indicating the first image correction process for white board. When a user presses the icon 905, the CPU 201 additionally displays a list 804 of image correction processes on the display unit 207, like the screen in FIG. 8.

FIG. 9 further illustrates an icon 906 that is a selection icon usable for instructing to save (next processing step). When a user presses the icon 906, the CPU 201 converts the format of the image displayed in the display area 903 to a PDF file and displays a screen 1201 as illustrated in FIG. 12 including a preview of the PDF file on the display unit 207.

Next, FIG. 10 will be described. FIG. 10 illustrates a screen 1001 to be displayed on the display unit 207 by the CPU 201. The screen 1001 is usable by a user for confirmation before an image having undergone an image correction process is saved and is also usable for receiving a user operation for changing the type of image correction process. The screen 1001 displays a result of the image correction process in the image correction mode based on the option 808 performed on the image having undergone a keystone correction process and a name of the image correction mode (or information for identifying the type of image correction process).

FIG. 10 further illustrates a display field 1002 similar to the display field 702.

FIG. 10 further illustrates a display area 1003 displaying a result of the image correction process in the image correction mode based on the option 808. Referring to FIG. 10, the display area 1003 displays a result of a second image correction process for white board.

An icon 1004 in FIG. 10 is similar to the icon 704.

FIG. 10 further illustrates an icon 1005 which displays the name of the image correction process applied to the image displayed on the display area 1003, similarly to the icon 705. Referring to FIG. 10, the icon 1005 displays "WHITE BOARD 2" indicating the second image correction process for white board. When a user presses the icon 1005, the CPU 201 additionally displays a list 804 of image correction processes on the display unit 207, like the screen in FIG. 8.

FIG. 10 further illustrates an icon 1006 that is a selection icon usable for instructing to save (next processing step). When a user presses the icon 1006, the CPU 201 converts the format of the image displayed in the display area 1003 to a PDF file and displays a screen 1201 as illustrated in FIG. 12 including a preview of the PDF file on the display unit 207.

Figure 11:
FIG. 11 is a schematic diagram illustrating a screen displayed on the mobile terminal.

Next, FIG. 11 will be described. FIG. 11 illustrates a screen 1101 to be displayed on the display unit 207 by the CPU 201. The screen 1101 is usable by a user for confirmation before an image having undergone an image correction process is saved and is also usable for receiving a user operation for changing the type of image correction process. The screen 1101 is usable by a user for confirmation before an image having undergone an image correction process is saved and is also usable for receiving a user operation for changing the type of image correction process.

FIG. 11 further illustrates a display field 1102 similar to the display field 702.

FIG. 11 further illustrates a display area 1103 displaying an image in the image correction mode based on the option 809. Referring to FIG. 11, the display area 1103 displays an image having undergone the keystone correction process only without any type of image correction process corresponding to the options 806 to 808.

An icon 1104 in FIG. 11 is similar to the icon 704.

FIG. 11 further illustrates an icon 1105 indicating that none of image correction processes corresponding the options 806 to 808 has been performed. Thus, the icon 1105 displays "NO IMAGE CORRECTION". When a user presses the icon 1105, the CPU 201 additionally displays a list 804 of image correction processes on the display unit 207, like the screen in FIG. 8.

FIG. 11 further illustrates an icon 1106 that is a selection icon usable for instructing to save (next processing step). When a user presses the icon 1106, the CPU 201 converts the format of the image displayed in the display area 1103 to a PDF file and displays a screen 1201 as illustrated in FIG. 12 including a preview of the PDF file on the display unit 207.

Next, FIG. 12 will be described. FIG. 12 illustrates a screen 1201 to be displayed on the display unit 207 by the CPU 201. The screen 1201 is usable by a user for setting an output destination of the PDF file obtained by the format conversion. The screen 1201 includes (or displays) a display field 1202, a display area 1203, an icon 1204, an icon 1205, and an icon 1206.

The display field 1202 displays a name ("20170329150834.pdf") of a PDF file to be output.

The display area 1203 displays an output preview of the PDF file. The CPU 201 generates the output preview based on a PDF file saved in response to a user press of the icon 706, 906, 1006, or 1106. The display content may correspond to the image displayed in the display area 703, 903, 1003, or 1103.

FIG. 12 illustrates an icon 1204 to be pressed by a user for setting a storage destination for storing a PDF file. When a user presses the icon, the CPU 201 displays a screen (not illustrated) usable by a user for selecting a storage destination for a PDF file and sets a storage destination selected by a user as a storage destination for the PDF file.

The icon 1205 may be pressed by a user for setting a destination for a PDF file. When a user presses the icon, the CPU 201 displays a screen on which a user can select an application (such as an electronic mail application or a Bluetooth (registered trademark) communication application) to be used for transmitting a PDF file. The CPU 201 then uses the application based on the user selection to set the destination for the PDF file and transmit the PDF file to the destination.

The icon 1206 is to be pressed by a user for setting a printer for printing a PDF file. When a user presses the icon, the CPU 201 displays a screen 1301 illustrated in FIG. 13 on the display unit 207.

The screen 1301 will be described. The screen 1301 can be operated by a user for setting a printer for printing a PDF file. A name (identification information) 1305 of the printer set on the screen 1301 is displayed. The screen includes (or displays) an area 1306 displaying print settings (or a part thereof) (hereinafter, printer settings 1306) for printing a PDF file by the set printer and a display area 1303 for a print preview of the PDF file based on the print settings. The screen 1301 further includes an icon 1307 for receiving an instruction to print a PDF file based on print settings defined by a user.

The display area 1303 may display a print preview of a PDF file. The print preview is generated by the defined print settings.

Figure 13:
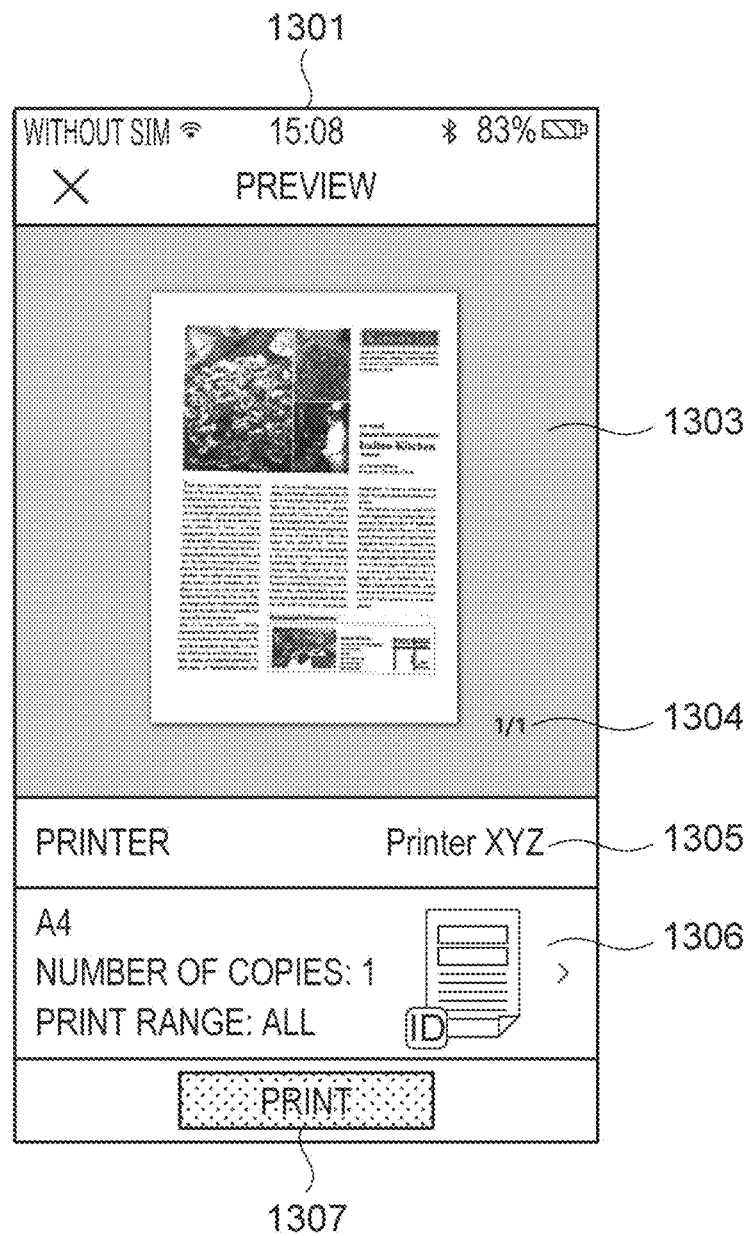
FIG. 13 is a schematic diagram illustrating a screen displayed on the mobile terminal.

FIG. 13 illustrates information 1304 indicating the page number of a displayed image and the total number of pages. According to the example shown in FIG. 13, the information 1304 indicates 1/1, which means the first page is being displayed, and the total number of pages is equal to one.

FIG. 13 further illustrates identification information 1305 indicating a name of a printer for printing a PDF file. The information 1305 can be pressed by a user and when a user presses the information icon, the CPU 201 displays a printer selection screen, not illustrated, and can receive a printer selection from a user. The CPU 201 then sets a printer selected by a user as a printer for printing a PDF file.

The print settings 1306 displays defined print settings. According to this embodiment, the print settings 1306 displays a set sheet size (A4), a number of copies (1), and a print range (ALL). The print settings 1306 can be pressed by a user. When a user presses the print settings 1306, the CPU 201 displays a print setting change screen, not illustrated. Through the screen, a user can change a setting of the print settings.

The print instruction icon 1307 may be pressed by a user for printing a PDF file by using a set printer. In response to a print instruction from a user based on a press of the icon 1307, the CPU 201 transmits a PDF file and defined print settings to the set printer through the data transmitting/receiving unit 205. When the printer receives the PDF file and the print settings, the printer prints the PDF file based on the print settings.

Up to this point, the screens illustrated in FIGS. 5A and 5B to 13 have been described which are to be displayed by the CPU 201 based on the application program.

Figure 4:
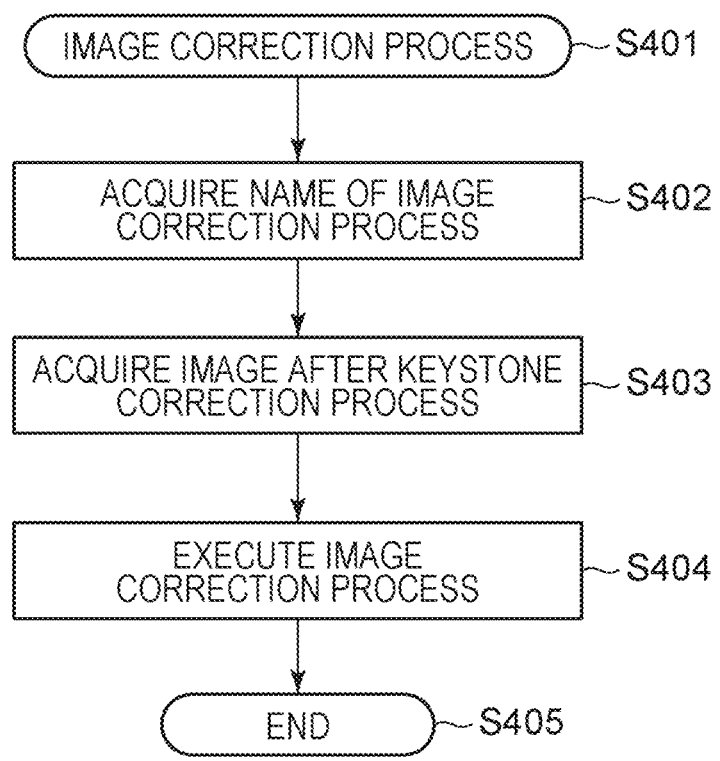
FIG. 4 is a flowchart illustrating a process according to an embodiment.

Next, a flow of processing for displaying the screens illustrated in FIGS. 5A and 5B to 13 based on the application program by the CPU 201 will be described with reference to the flowcharts illustrated in FIGS. 3 and 4. The processing illustrated in the flowchart in FIG. 3 can be implemented by an application program stored in the storage unit 204 and executed by the CPU 201. The flowchart is for printing where the document image correction mode is preset.

In step S301, the CPU 201 starts the processing in the flowchart.

In step S302, the CPU 201 displays a top screen (screen 501 illustrated in FIG. 5A) of the application on the display unit 207. When the CPU 201 detects that a user has pressed the capture icon 505 on the screen, the processing moves to step S303.

In step S303, the CPU 201 starts the camera 104 and displays the screen 509 illustrated in FIG. 5B on the display unit 207. The screen displays a live view video image of a subject, as described above, but does not display information for identifying the type of image correction process to be executed in step S306, which will be described below. When the CPU 201 detects that a user has pressed the shutter button 511 while the screen 509 is being displayed, the processing moves to step S304.

In step S304, the CPU 201 obtains an image of a subject captured by the camera 104. In other words, the CPU 201 obtains an image captured in response to an image-capture instruction from a user. The captured image is temporarily held in the storage unit 204.

Next, in step S305, the CPU 201 displays the screen (FIG. 6) for setting a target area to undergo a keystone correction process on the display unit 207. If the CPU 201 detects that a user has pressed the icon 607, the processing moves to the next step.

In step S306, the CPU 201 executes a keystone correction process on an image in the area designated in the cropping frame 604. The CPU 201 stores the image having undergone the keystone correction process in a keystone-corrected image storage area within the storage unit 204.

Next in step S307, the CPU 201 may select a preset (or predetermined) image correction mode from a plurality of predetermined image correction modes. It is assumed here that the document image correction mode is selected.

Next in step S308, the CPU 201 sets a name of the image correction mode selected in step S307. In this case, the CPU 201 stores the name of the image correction mode in a process name storage area within the storage unit 204. Here, the CPU 201 stores "DOCUMENT" as an image correction process name in the process name storage area within the storage unit 204.

In step S309, the CPU 201 reads out the image having undergone the keystone correction process and stored in the keystone-corrected image storage area and performs the image correction process corresponding to the image correction mode stored in the process name storage area on the read image. Here, the image correction process corresponding to the document image correction mode is executed. After that, the CPU 201 stores a resulting image of the applied image correction process in a corrected image storage area within the storage unit 204. In other words, the processing in steps S307 to S309 corresponds to automatic execution of a predetermined image correction process without receiving a selection of an image correction process from a user. The image correction processes will be described in detail with reference to the flowchart in FIG. 4.

In step S310, the CPU 201 displays the image having undergone the image correction process and stored in the corrected image storage area and the name stored in the process name storage area on the corresponding display area and icon, respectively.

For example, in step S310 subsequent to step S309, the CPU 201 displays the screen 701 illustrated in FIG. 7 on the display unit 207. In this case, the CPU 201 reads out a resulting image of the applied image correction process from the corrected image storage area within the storage unit 204 and displays it in the display area 703 on the screen 701. The CPU 201 reads out the image correction mode name stored in the process name storage area within the storage unit 204 and displays it on the icon 705 on the display unit 207. This may facilitate a user to grasp the type of image correction process performed on the image being displayed in the display area 703. In other words, the CPU 201 automatically displays the image having undergone an image correction process and the name of the image correction mode. The expression "automatically displays" refers to displaying a name (on the icon 705) of an image correction process in association with display of an image having undergone the image correction process without additionally receiving an instruction to display the name from a user.

For example, in step S310 subsequent to step S319, which will be described below, the CPU 201 displays the image having undergone the image correction process in S319 in the corresponding display area and displays the name of the image correction mode corresponding to the image correction process on the corresponding icon. Thus, the corresponding one of the screens illustrated in FIGS. 7, 9, 10, and 11 may be displayed.

If the CPU 201 detects in step S311 that a user has pressed the name icon (705, 905, 1005, 1105) corresponding to the target image correction process, the processing moves to step S312 where the list 804 is additionally displayed, like the screen 801 in FIG. 8. If the CPU 201 detects that a user has pressed the save icon (706, 906, 1006, 1106) in step S311, the processing moves to step S320.

If the CPU 201 in step S312 detects that one of the plurality of options in the list 804 illustrated in FIG. 8 has been selected, the CPU 201 identifies which option has been selected. If the CPU 201 identifies that the option 806 has been pressed, the processing moves to step S313. If the CPU 201 identifies that the option 807 has been selected, the processing moves to step S314. If the CPU 201 identifies the option 808 has been selected, the processing moves to step S315. If the CPU 201 identifies that the option 809 has been pressed, the processing moves to step S313. If the CPU 201 identifies that the option 810 has been selected, the processing moves to step S311.

In step S313, the CPU 201 stores "DOCUMENT" as a name corresponding to the image correction process to be applied hereafter in a temporary area within the storage unit 204.

In step S314, the CPU 201 stores "WHITE BOARD 1" as a name corresponding to the image correction process to be applied hereafter in a temporary area within the storage unit 204.

In step S315, the CPU 201 stores "WHITE BOARD 2" as a name corresponding to the image correction process to be applied hereafter in a temporary area within the storage unit 204.

In step S316, the CPU 201 stores "NO IMAGE CORRECTION" as a name to indicate that no image correction process is to be applied in the temporary area within the storage unit 204.

In step S317, the CPU 201 determines whether the name stored in the process name storage area within the storage unit 204 and the name stored in the temporary area within the storage unit 204 are matched or not. If so, the CPU 201 advances the processing to step S310. If not, the CPU 201 advances the processing to step S318.

In step S318, the CPU 201 overwrites and stores the name stored in the temporary area within the storage unit 204 in the process name storage area within the storage unit 204.

In subsequent step S319, the CPU 201 reads out the image having undergone the keystone correction process from the keystone-corrected image storage area within the storage unit 204 and performs the image correction process corresponding to the image correction mode stored in the process name storage area on the read image. The CPU 201 then stores the image having undergone the image correction process in the corrected image storage area within the storage unit 204. The image correction processes will be described in detail with reference to the flowchart in FIG. 4. The CPU 201 then advances the processing to step S310.

In step S320, the CPU 201 converts the format of the image having undergone the image correction process to a PDF file and stores it in a file storage area within the storage unit 204. Having described that a PDF format is applied as the converted format, other file formats may be applied. The file format may be processable by a printer. Then, the CPU 201 displays the screen 1201 in FIG. 12 on the display unit 207. If the CPU 201 detects that the icon 1206 on the screen 1201 has been pressed by a user, the processing moves to step S321.

In step S321, the CPU 201 displays the screen 1301 in FIG. 13 on the display unit 207. Here, defining or changing a setting for a printer for printing may be performed. If the CPU 201 detects that the print instruction icon 1307 has been pressed by a user, the processing moves to step S322.

In step S322, the CPU 201 transmits a PDF file stored in the file storage area and print settings to the set printer (such as "Printer XYZ").

In step S323, the CPU 201 ends the processing in the flowchart.

Through the processing in the flow, a keystone correction process and an image correction process can be performed on a captured image, and the processed image can be printed. Though this flow dose not display information for identifying the applied type of image correction process in the live view video image of a subject that is being displayed, the screen after the image correction process is performed displays the information for identifying the applied type of image correction process. This can prevent unclear display of the live view video of a subject to be image-captured and can facilitate a user to grasp which one of a plurality of types of image correction process has been applied.

Next, the image correction processes will be described with reference to the flowchart in FIG. 4.

In step S401, the CPU 201 starts the processing in the flowchart.

In step S402, the CPU 201 reads out a name from the process name storage area within the storage unit 204.

In step S403, the CPU 201 reads out an image having undergone a keystone correction process from the keystone-corrected image storage area within the storage unit 204.

In step S404, the CPU 201 applies the image correction process corresponding to the read name on the image having undergone the keystone correction process and stores the processed image in the corrected image storage area within the storage unit 204. According to this embodiment, a plurality of predetermined image correction processes are available which correspond to the names "DOCUMENT", "WHITE BOARD 1", "WHITE BOARD 2", and "NO IMAGE CORRECTION". For example, the image correction process corresponding to the name "DOCUMENT" performs the shadow removal processing on an image having undergone a keystone correction process. The image correction process corresponding to the name "WHITE BOARD 1" performs monochromating processing on the image having undergone the keystone correction process to monochromatically display a cluster part having similar colors indicated by a marker in the image in addition to the shadow removal processing. The image correction process corresponding to the name "WHITE BOARD 2" performs processing for expanding monochromated area on the image having undergone the keystone correction process in addition to the processing corresponding to the name "WHITE BOARD 1". The processing corresponding to the name "NO IMAGE CORRECTION" performs no type of image correction process on the image having undergone the keystone correction process.

In step S405, the CPU 201 ends the processing in the flowchart.

According to the present disclosure, information for identifying a predetermined image correction process that has been performed can be displayed in a state that the image having undergone the predetermined image correction process is displayed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing method comprising:
obtaining an image captured by an imaging unit;
performing keystone correction on an image cut out of the obtained image; performing document image correction on the image having undergone the keystone correction; and
performing white board image correction on the image having undergone the keystone correction;
wherein the document image correction is performed prior to the white board image correction, and
wherein the white board image correction is correction to remove shadow shown in the image to increase brightness of the image and make similar colors in the image having the increased brightness monochromatic.

2. The information processing method according to claim 1, wherein
the document image correction is correction to remove shadow shown in the image to increase brightness of the image.

3. The information processing method according to claim 1, wherein
the keystone correction is processing of performing geometric correction on the cut-out image into a rectangular or square shape.

4. The information processing method according to claim 1, wherein
the imaging unit is a camera.

5. The information processing method according to claim 1, wherein
the image having undergone the document image correction is displayed, and the white board image correction is performed based on a user instruction.

6. The information processing method according to claim 1,
wherein the document image correction and the white board image correction are processing for correcting brightness of the image.

7. An information processing apparatus comprising:
one or more memory devices that store a set of instructions; and
one or more processors that execute the set of instructions to:
obtain an image captured by an imaging unit;
perform keystone correction on an image cut out of the obtained image;
perform document image correction on the image having undergone the keystone correction; and
perform white board image correction on the image having undergone the keystone correction;
wherein the document image correction is performed prior to the white board image correction, and
wherein the white board image correction is correction to remove shadow shown in the image to increase brightness of the image and make similar colors in the image having the increased brightness monochromatic.

8. The information processing apparatus according to claim 7, wherein
   the document image correction is correction to remove shadow shown in the image to increase brightness of the image.

9. The information processing apparatus according to claim 7, wherein
   the keystone correction is processing of performing geometric correction on the cut-out image into a rectangular or square shape.

10. The information processing apparatus according to claim 7, wherein
    the imaging unit is a camera.

11. The information processing apparatus according to claim 7, wherein
    the image having undergone the document image correction is displayed, and the white board image correction is performed based on a user instruction.

12. The information processing apparatus according to claim 7,
    wherein the document image correction and the white board image correction are processing for correcting brightness of the image.

\* \* \* \* \*